*(12)* United States Patent
Higuchi et al.

(10) Patent No.: US 11,950,319 B2
(45) Date of Patent: Apr. 2, 2024

(54) COMMUNICATION SYSTEM FOR ERASING DATA ON A USER THAT REMAINS IN AN AFTER-USE TERMINAL DEVICE DUE TO CHANGE OF TERMINAL DEVICES AND METHOD THEREOF

(71) Applicant: NTT DOCOMO, INC., Chiyoda-ku (JP)

(72) Inventors: Yuuta Higuchi, Chiyoda-ku (JP); Kazuoki Ichikawa, Chiyoda-ku (JP); Takashi Okada, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 822 days.

(21) Appl. No.: 16/981,594

(22) PCT Filed: Mar. 4, 2019

(86) PCT No.: PCT/JP2019/008383
§ 371 (c)(1),
(2) Date: Sep. 16, 2020

(87) PCT Pub. No.: WO2019/181460
PCT Pub. Date: Sep. 26, 2019

(65) Prior Publication Data
US 2021/0076193 A1 Mar. 11, 2021

(30) Foreign Application Priority Data

Mar. 19, 2018 (JP) ................................ 2018-050505

(51) Int. Cl.
*H04W 8/18* (2009.01)
*G06F 3/06* (2006.01)
*H04W 74/00* (2009.01)

(52) U.S. Cl.
CPC .......... *H04W 8/183* (2013.01); *G06F 3/0604* (2013.01); *G06F 3/0652* (2013.01); *G06F 3/0655* (2013.01); *G06F 3/0679* (2013.01)

(58) Field of Classification Search
CPC ..... H04W 8/183; H04W 4/50; H04W 74/004; H04M 11/00; H04M 1/00; G06F 3/0604; G06F 3/0652; G06F 3/0655; G06F 3/0679
See application file for complete search history.

(56) References Cited

U.S. PATENT DOCUMENTS 9,986,591 B2 * 5/2018 Yada .................... H04W 76/36
10,449,310 B2 * 10/2019 Jackson ............. A61B 5/14532
(Continued)

OTHER PUBLICATIONS

International Search Report issued on Apr. 9, 2019 in PCT/JP2019/008383 filed on Mar. 4, 2019, 1 page.
(Continued)

*Primary Examiner* — Khawar Iqbal
(74) *Attorney, Agent, or Firm* — Oblon, McClelland, Maier & Neustadt, L.L.P.

(57) ABSTRACT

When terminal identification information TI of one terminal device used by a user among two or more terminal devices is newly stored in a memory of a host device together with user identification information UI (S3a), an examination part examines, in the memory of the host device, a presence or absence of terminal identification information (terminal identification information TI-p) corresponding to the user identification information UI, excluding terminal identification information TI and terminal identification information corresponding to a terminal device that is currently used by the user (S11). When the terminal identification information TI-p exists, a management part performs control to transmit predetermined instruction information together with the terminal identification information TI-p to the two or more (Continued)

terminal devices (S12). When the terminal identification information TI-p received together with the instruction information from the host device matches own terminal identification information, an information erasure part erases information on a user other than the user who is currently stored in own memory (S13).

3 Claims, 7 Drawing Sheets

(56) References Cited

U.S. PATENT DOCUMENTS

| | | | |
|---|---|---|---|
| 10,624,139 B2* | 4/2020 | Sasadai | H04W 76/14 |
| 10,952,014 B2* | 3/2021 | Yang | G06Q 30/0639 |
| 10,984,099 B2* | 4/2021 | Manadhata | H04L 63/102 |
| 11,587,062 B1* | 2/2023 | Kurani | G06Q 20/3672 |
| 2015/0358792 A1* | 12/2015 | Hashimoto | H04W 8/26 370/329 |
| 2017/0272521 A1* | 9/2017 | Takahashi | H04W 4/08 |
| 2019/0174010 A1* | 6/2019 | Rajadurai | H04M 15/85 |
| 2020/0260287 A1* | 8/2020 | Hendel | G06N 5/04 |
| 2021/0282177 A1* | 9/2021 | Ichikawa | H04W 64/006 |
| 2022/0078029 A1* | 3/2022 | Galdo | H04L 9/006 |
| 2022/0321543 A1* | 10/2022 | Djakovic | H04L 63/0823 |

OTHER PUBLICATIONS

Unlocking of SIM Lock, NTT DOCOMO, Inc. [Search on Feb. 21, 2018], Internet https://www.nttdocomo.co.jp/support/proc tre/simcard/, with English version, 8 total pages.

* cited by examiner

COMMUNICATION SYSTEM FOR ERASING DATA ON A USER THAT REMAINS IN AN AFTER-USE TERMINAL DEVICE DUE TO CHANGE OF TERMINAL DEVICES AND METHOD THEREOF

TECHNICAL FIELD

The present invention relates to a technique for erasing information on a user, the information remaining in a terminal device due to a change from the terminal device to a terminal device to be newly used.

BACKGROUND ART

Recently, SIM cards (Subscriber Identity Module Cards) have become widespread. For this reason, during a user attaches the SIM card to a certain terminal device X, the user can temporarily use the terminal device X (Non-patent literature 1).

PRIOR ART LITERATURE

Non-Patent Literature

Non-patent literature 1: Unlocking of SIM Lock, NTT DOCOMO, INC., [Search on Feb. 21, 2018], Internet <https://www.nttdocomo.co.jp/support/procedure/simcard/>

SUMMARY OF THE INVENTION

Problems to be Solved by the Invention

When a user finishes use of the terminal device X and removes a SIM card from the terminal device X, there is a possibility that information on the user (for example, account information, calling history, and cache of Internet browser) remains in the terminal device X. The possibility can be zero by performing processing in which the user completely erases the information on the user stored in the terminal device X before the SIM card is removed from the terminal device X. However, if the erasure processing performed by the user is inappropriate, it cannot be denied that the information on the user may not be completely erased. Further, even when the information on the user is erased by a communication procedure instead of such artificial processing, it cannot be denied that the information on the user may not be completely erased due to some troubles in the communication procedure.

Therefore, an object of the present invention is to provide a technique for erasing information on a user that remains in a terminal device due to a change from the terminal device to a terminal device to be newly used.

Means to Solve the Problems

A communication system of the present invention includes a host device and two or more terminal devices. The host device includes: a host memory to store terminal identification information unique to each of the two or more terminal devices and identification information unique to each of two or more users; an examination part that examines a presence or absence of information; and a management part that performs control to transmit information to the two or more terminal devices. Each of the two or more terminal devices includes: a terminal memory to store information on a user and own terminal identification information; and an information erasure part that erases information stored in the own terminal memory. When user identification information UI of a user and terminal identification information TI of one terminal device used by the user among the two or more terminal devices is newly stored in the host memory, the examination part examines a presence or absence of terminal identification information TI-p corresponding to the user identification information UI, excluding the terminal identification information TI and the terminal identification information corresponding to the terminal device that is currently used by the user. When the terminal identification information TI-p exists, the management part performs control to transmit predetermined instruction information together with the terminal identification information TI-p to the two or more terminal devices. When the terminal identification information TI-p received together with the instruction information from the host device matches the own terminal identification information, the information erasure part erases the information on the user stored in the own terminal memory.

Effects of the Invention

According to the present invention, it is possible to erase information on a user that remains in a terminal device due to a change from the terminal device to a terminal device to be newly used.

DETAILED DESCRIPTION OF THE EMBODIMENTS

An embodiment of the present invention will be described with reference to the drawings. The background to the situation where the present invention functions and the embodiment in the situation will be described based on Cases.

<Case 1>

A communication system 1 includes a host device H and two or more terminal devices T. One group is formed for each user, and each group includes one or more terminal devices T. in an example of FIG. 1, a group G of a user A (the user A is not shown) includes two terminal devices T-A1 and T-A2. When one group includes two or more terminal devices T, the two or more terminal devices T in the group cooperate with each other by short-range wireless communication (IEEE802.11, Bluetooth (registered trademark) or the like). Each group does not include a device having a central role of wireless connection, such as a master device. Each of the two or more terminal devices T in one group is scheduled to be used by the same user. In addition, each of the two or more terminal devices T included in the communication system 1 can be connected to a mobile communication network C using subscriber information (the subscriber information will be described below) of the user who uses these terminal device T. For example, the terminal device T-A1 can be connected to the mobile communication network C using subscriber information of a user A who uses the terminal device T-A1. In Case 1 where the host device H is connected to the mobile communication network C, the host device H has a function of providing some service to the terminal devices T.

Figure 1:
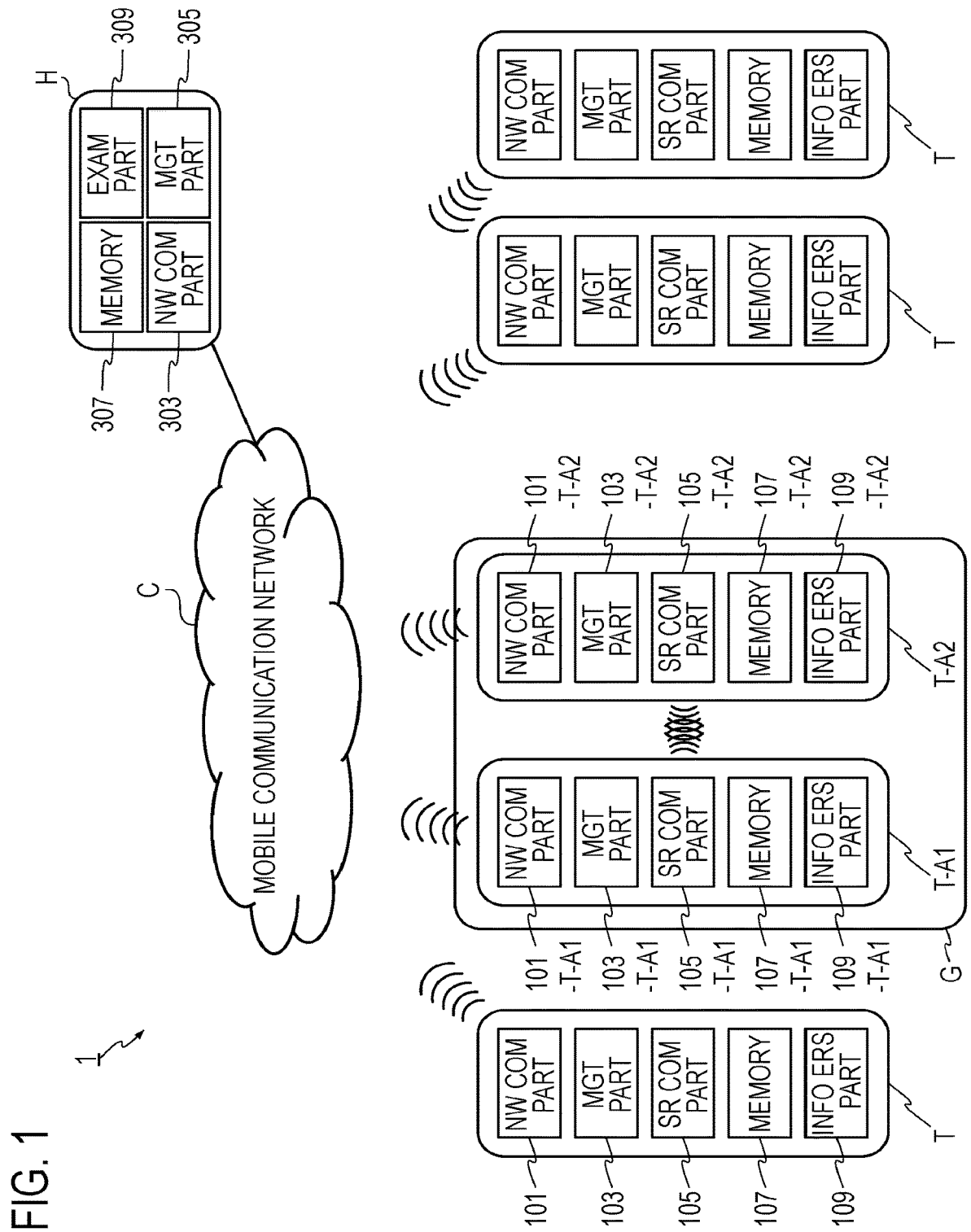
FIG. 1 is a diagram showing a configuration example of a communication system in Case 1.
Figure 2:
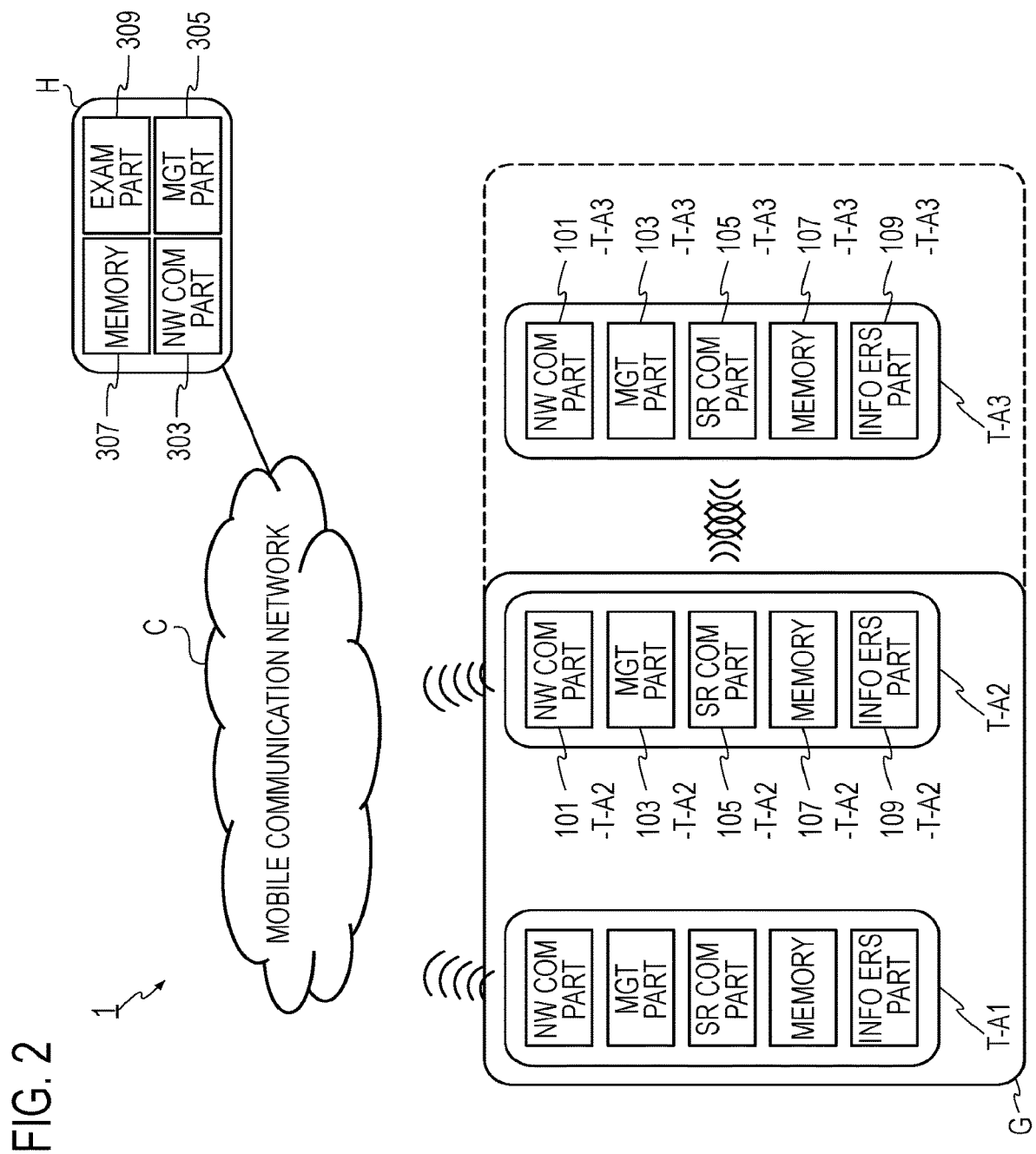
FIG. 2 is a diagram showing a configuration example of the communication system in Case 1 (subscription)
Figure 4:
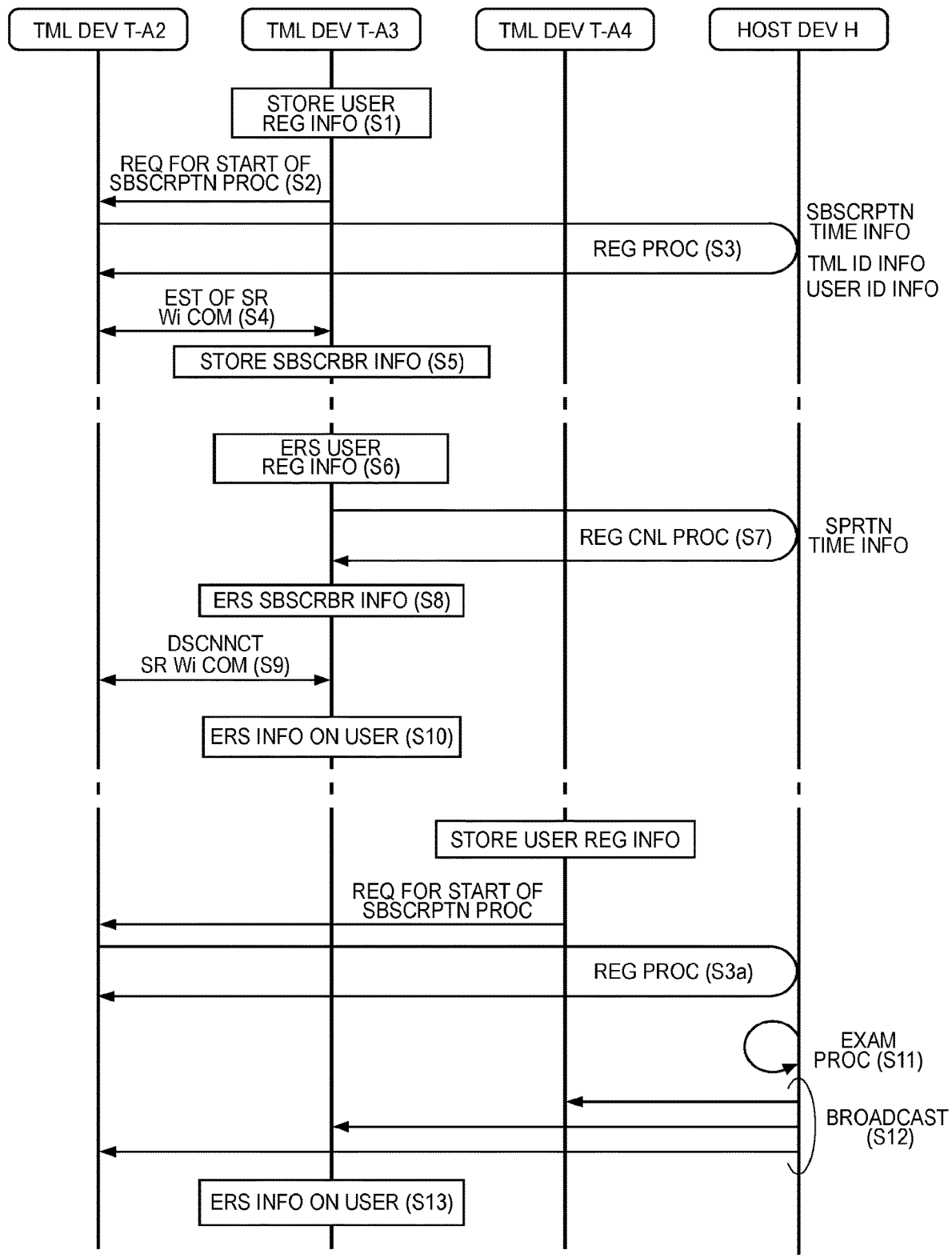
FIG. 4 is a processing flowchart in Case 1.

With reference to FIGS. 2 and 4, a description will be given with respect to subscription processing of newly subscribing a terminal device T-A3, which is scheduled to be used by the user A, to the group G shown in FIG. 1.

First, as necessary, user registration information is stored in a memory 107-T-A3 of the terminal device T-A3 by an operation of the user A (step S1). The "user registration information" is information necessary for receiving service provision from the host device H, and may be an example of personally identifiable information such as the name, family name, or "personal identification number" that is stipulated in, "Act on the Use of Numbers to Identify Specific Individuals in Administrative Procedures, etc." (Act No. 27 of 2013 in Japan).

Next, with the operation performed by the user A as a trigger, a management part 103-T-A3 of the terminal device T-A3 transmits information I, which is used to request the start of the subscription processing to the group G, to any one of terminal devices already existing in the group G (the terminal device T-A2 in this example) via a short-range communication part 105-T-A3 of the terminal device T-A3 (step S2). The information I includes at least terminal identification information TI [A3] unique to the terminal device T-A3. The terminal identification information may be International Mobile Equipment Identity (IMEI) as an example.

Subsequently, registration processing of step S3 is executed. After a short-range communication part 105-T-A2 of the terminal device T-A2 receives the information I, a management part 103-T-A2 of the terminal device T-A2 transmits terminal identification information TI [A3], which is included in the information I, and user identification information UI [A], which is unique to the user A and is already stored in the memory 107-T-A2 of the terminal device T-A2, to the host device H via an NW communication part 101-T-A2 of the terminal device T-A2 and the mobile communication network C. The user identification information may be International Mobile Subscriber Identity (IMSI) as an example. A management part 305 of the host device H stores, in the memory 307 of the host device H, a set of the terminal identification information TI [A3] and the user identification information UI [A] received from the terminal device T-A2 via the NW communication part 303 together with current time information (that is, time information when the terminal device T-A3 is subscribed to the group G).

Next, short-range wireless communication is established between the terminal device T-A3 and each of the terminal devices already existing in the group G (step S4). However, FIG. 4 does not show the establishment of the short-range wireless communication between the terminal device T-A3 and the terminal device T-A1. Since establishment of communication using the short-range wireless communication is well known, the description will not be presented.

Next, under control of the management part 103-T-A3, the subscriber information of the user A is stored in a memory 107-T-A3 of the terminal device T-A3 (step S5). After such processing, the terminal device T-A3 and the host device H get to be able to communicate with each other via the mobile communication network C. The "subscriber information" is information necessary for connection to the mobile communication network C, and includes an IMSI and a calling number. In the processing of step S5, for example, the subscriber information of the user A stored in a SIM card is copied to the memory 107-T-A3 of the terminal device T-A3 under the control of the management part 103-T-A3.

Through the above processing, the subscription of the terminal device T-A3 to the group G is completed. Next, processing of separating the terminal device T-A3 from the group G will be described with reference to FIG. 4. Separation processing is executed with a predetermined action (for example, a log-off operation) performed by the user A or a predetermined situation (for example, a situation in which the short-range wireless communication established in step S4 is disconnected for a predetermined time) as a trigger.

First, the management part 103-T-A3 of the terminal device T-A3 erases the user registration information stored in the memory 107-T-A3 of the terminal device T-A3 as necessary (step S6).

Next, registration cancellation processing is executed in step S7. The management part 103-T-A3 of the terminal device T-A3 accesses the host device H via a communication part 101-T-A3 of the terminal device T-A3 and the mobile communication network C. The management part 305 of the host device H stores current time information (that is, time information when the terminal device T-A3 is separated from the group G) in the memory 307 of the host device H.

Next, the management part 103-T-A3 of the terminal device T-A3 erases the subscriber information of the user A stored in the memory 107-T-A3 of the terminal device T-A3 (step S8). After such processing, the terminal device T-A3 becomes unable to be connected to the mobile communication network C.

Subsequently, the short-range wireless communication is disconnected between the terminal device T-A3 and each of the terminal devices already existing in the group G (step S9).

Next, the management part 103-T-A3 of the terminal device T-A3 erases information on the user A stored in the memory 107-T-A3 of the terminal device T-A3 (step S10). The "information on the user" includes (1) information that can specify the user by itself (for example, user registration information, account information, or subscriber information), (2) information that can specify the user by collation with another information (for example, the last name of the user), and (3) information that can hardly infer the user by itself and is used by user during use of the terminal device (for example, location information of the terminal device T-A3, calling history, or cache of Internet browser).

Through the above processing, the separation of the terminal device T-A3 from the group G is completed. However, when some trouble occurs during the separation processing, the information on the user A may remain in the memory 107-T-A3 of the terminal device T-A3.

Figure 3:
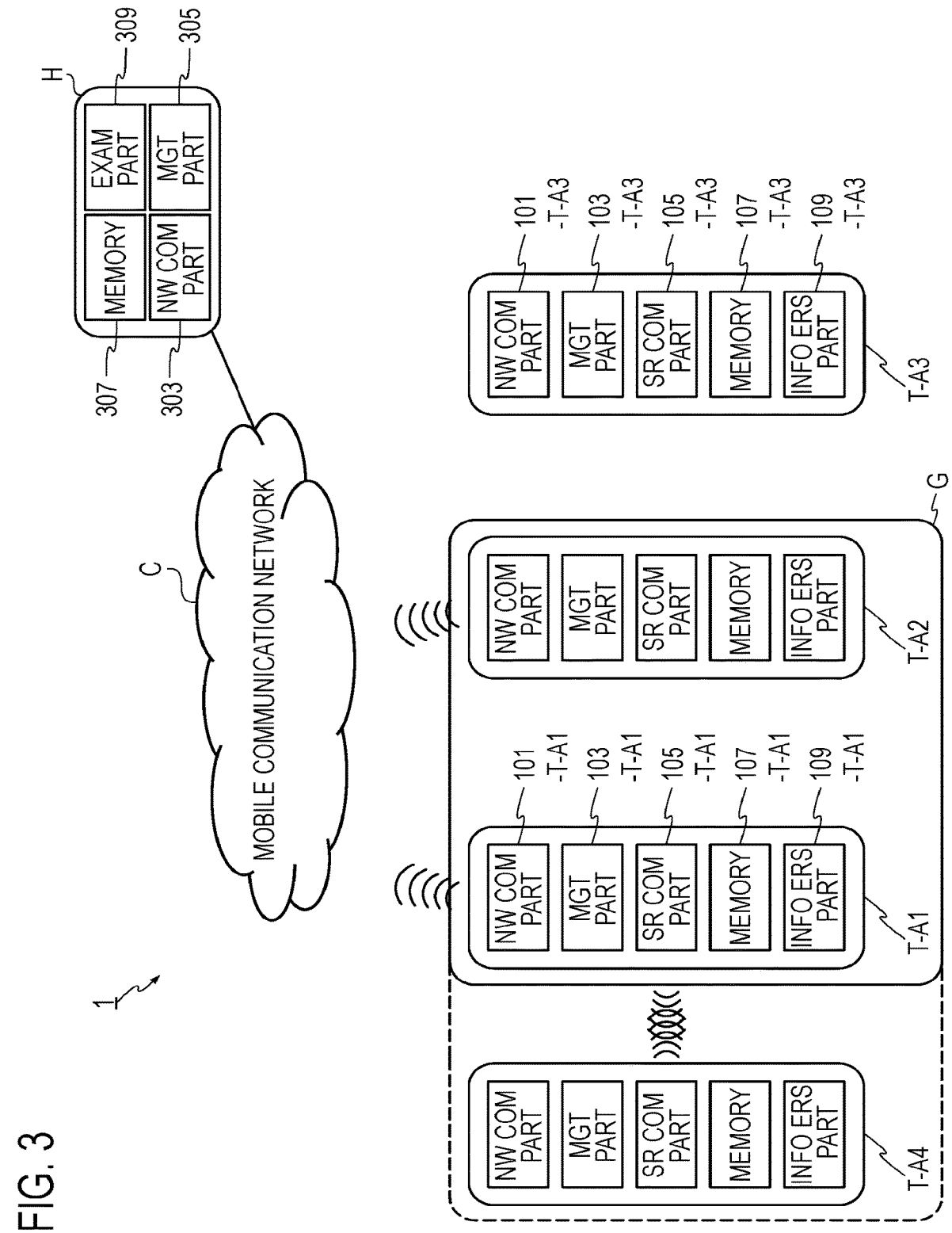
FIG. 3 is a diagram showing a configuration example of the communication system in Case 1 (separation)

In such a situation, when a terminal device T-A4 is using the subscriber information had been used by the terminal device T-A3 for the connection to the mobile communication network C, the terminal device T-A3 cannot be reconnected to the mobile communication network C using the subscriber information (later priority), and a device other than the terminal device T-A3 can also not instruct the terminal device T-A3 to erase the information on the user A remaining in the memory 107-T-A3 of the terminal device T-A3 (see FIG. 3).

Accordingly, one embodiment of the present invention is performed. Processing of erasing the information on the user A remaining in the memory 107-T-A3 of the terminal device T-A3 will be described with reference to FIG. 4.

First, if the host device H receives terminal identification information TI [A4] and user identification information UI [A] unique to the terminal device T-A4, which are newly subscribed to the group G, from any one of the terminal devices forming the group G (the terminal device T-A2 in the example shown in FIG. 4) via the NW communication part 303 in processing of step S3 in the procedure in which the terminal device T-A4 is subscribed to the group G (processing of step S3a in FIG. 4) and the host device H stores the terminal identification information TT [A4] and the user identification information UI [A] in the memory 307 of the host device H under the control of the management part 305, then an examination part 309 of the host device H examines whether not only the terminal identification information TI [A4] but also terminal identification information Y corresponding to the user identification information UI [A] exists in the memory 307 of the host device H (step S11). At this time, the examination part 309 examines terminal identification information of the terminal device added with separation time information so as to avoid misrecognition that the terminal identification information (the terminal identification information TI [A1] unique to the terminal device T-A1 and the terminal identification information TI [A2] unique to the terminal device T-A2) corresponding to the terminal device currently used by the user A is the terminal identification information Y. Since the examination part needs to examine the presence or absence of the terminal identification information corresponding to the user identification information UI [A] excluding the terminal identification information TI [A4] and the terminal identification information TI [A1] and TI [A2] corresponding to the terminal devices T-A1 and T-A2 which are currently used by the user A, use of the separation time information is not essential.

If the terminal identification information Y exists, then the management part 305 of the host device H carries out control for broadcasting, to all the terminal devices T included in the communication system 1, predetermined instruction information (request information for instructing information erasure processing to be described below) together with the terminal identification information Y (step S12). The broadcast method may be sequential transmission without being limited to simultaneous transmission. When some terminal devices T do not complete the reception of the instruction information due to power OFF or the like, it is preferable that the host device H repeatedly transmits the instruction information together with the terminal identification information Y to these terminal devices T in a regular or irregular manner.

Each of the terminal devices T included in the communication system 1 executes information erasure processing in step S13. An information erasure part 109 of the terminal device T erases information on a user other than the user stored currently in its own memory if the terminal identification information Y received together with the instruction information from the host device H matches its own terminal identification information (step S13). In this example, in a terminal device T-i other than the terminal device T-A3, since the terminal identification information Y does not match its own terminal identification information, the instruction information is ignored. However, in the terminal device T-A3, since the terminal identification information Y matches its own terminal identification information, an information erasure part 109-T-A3 of the terminal device T-A3 erases the information on the user stored in the memory 107-T-A3. However, the user corresponding to the information erased by the information erasure part 109-T-A3 of the terminal device T-A3 is a person other than the user who is currently using the terminal device T-A3.

<Case 2>

Figure 5:
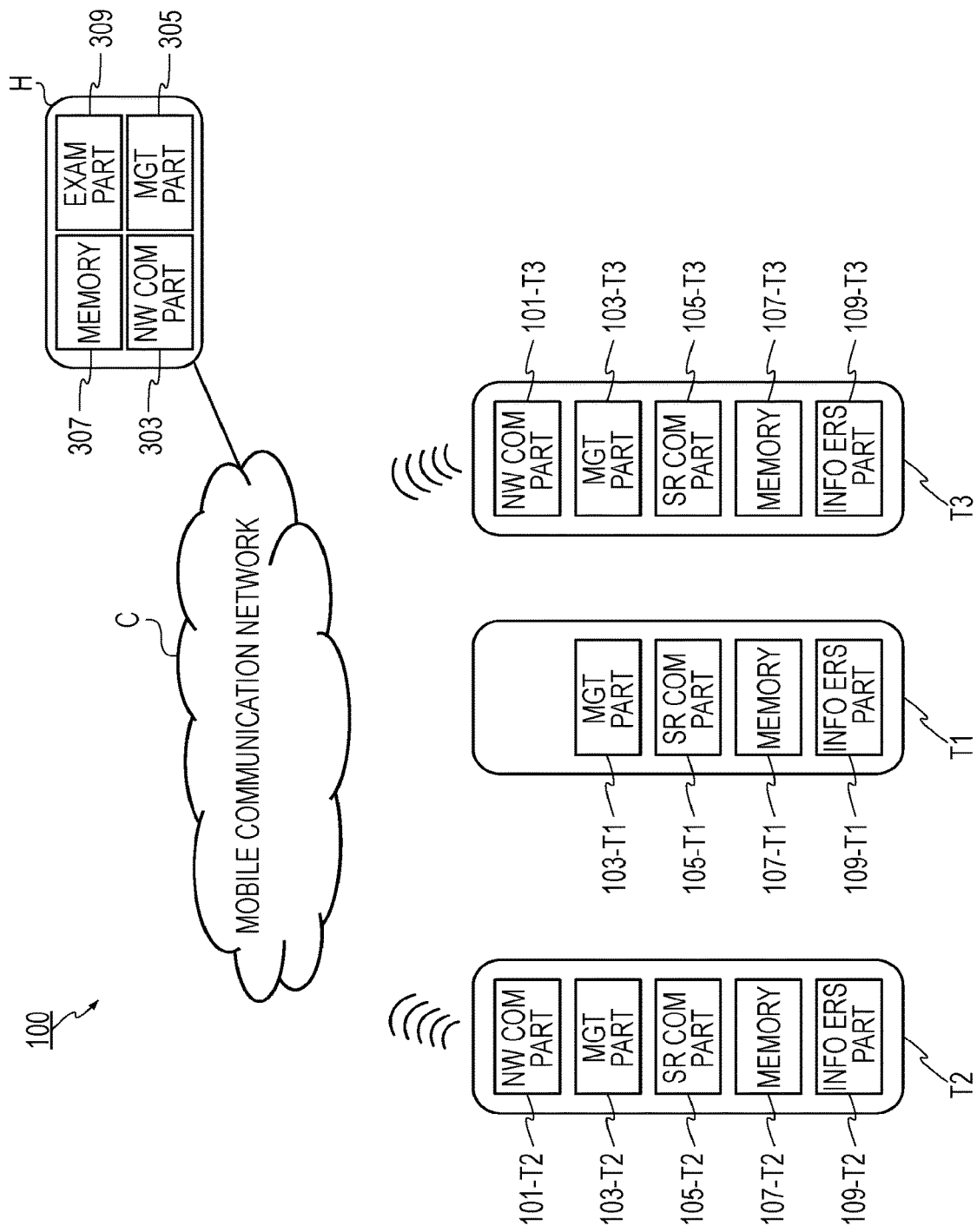
FIG. 5 is a diagram showing a configuration example of a communication system in Case 2.

A communication system 100 includes a host device H and two or more terminal devices T (three terminal devices T1, T2, and T3 in the example of FIG. 5). Each of the two or more terminal devices T is scheduled to be used by the same user A. In addition, some of the two or more terminal devices T included in the communication system 100 can be connected to a mobile communication network C using subscriber information of a user who uses these terminal device T. For example, a terminal device T2 can be connected to the mobile communication network C using subscriber information of a user A who uses the terminal device T2. The host device H is connected to the mobile communication network C.

Figure 6:
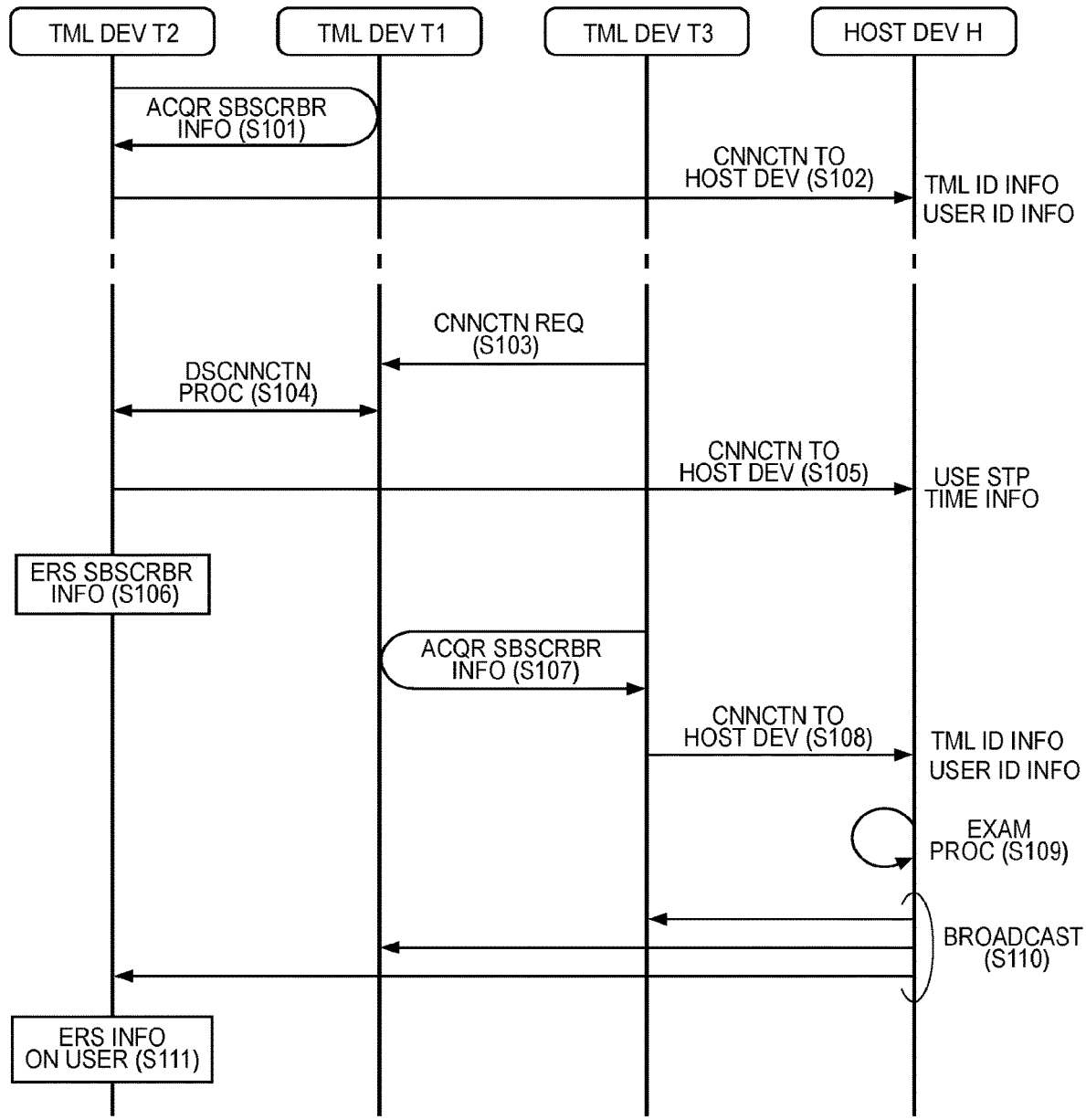
FIG. 6 is a processing flowchart in Case 2.

Subscriber information of the user A necessary for connection to the mobile communication network C is stored in a memory 107-T1 of the terminal device T1. In Case 2, the terminal device T1 is a device, which does not have a function capable of being connected to the mobile communication network C for itself, for example, a short-range wireless communication (IEEE802.11, Bluetooth (registered trademark) or the like) device equipped with a SIM card. A flow of processing in Case 2 will be described below with reference to FIG. 6.

First, for the connection of the terminal device T2 to the mobile communication network C, a management part 103-T2 of the terminal device T2 performs processing for connection to the terminal device T1 via a short-range communication part 105-T2, and acquires subscriber information from the terminal device T1 (step S101). Subsequently, the management part 103-T2 of the terminal device T2 is connected to the host device H with the subscriber information via an NW communication part 101-T2 and the mobile communication network C, and the host device H stores, in a memory 307 of the host device H, a set of terminal identification information TI [2] unique to the terminal device T2 and user identification information UI [A] unique to the user A (step S102).

When the user A stops using the terminal device T2 and newly uses a terminal device T3, a management part 103-T3 of the terminal device T3 performs a connection request to the terminal device T1 via a short-range communication part 103-T3 (step S103). Disconnection processing is performed between the terminal device T1 and the terminal device T2 (step S104). The management part 103-T2 of the terminal device T2 accesses the host device H via a communication part 101-T2 of the terminal device T2 and the mobile communication network C. A management part 305 of the host device H stores current time information (that is, time information when the use of the terminal device T2 is stopped) in the memory 307 of the host device H (step S105). The management part 103-T2 of the terminal device T2 erases the subscriber information stored in the memory 107-T2 (step S106). After the terminal device T2 and the terminal device T1 are normally disconnected, the management part 103-T3 of the terminal device T3 performs processing for connection to the terminal device T1 via a short-range communication part 105-T3 and acquires the subscriber information from the terminal device T1 (step S107). The management part 103-T3 of the terminal device T3 is connected to the host device H with the subscriber information via an NW communication part 101-T3 and the mobile communication network C, and the host device H stores, in the memory 307 of the host device H, a set of terminal identification information TI [3] unique to the terminal device T3 and user identification information UI [A] unique to the user A (step S108).

When the processing of step S104 is not executed (that is, when the disconnection request from the terminal device T1 does not reach the terminal device T2), the subscriber information stored in the terminal device T2 is not erased. When the connection processing between the terminal device T3 and the terminal device T1 is executed without erasing the subscriber information of the terminal device T2, two terminal devices having the same subscriber information are generated. Then, when the terminal device T3 is connected to the host device H and the terminal identification information stored in the memory 307 of the host device H is updated, the terminal device T2 cannot be connected to the mobile communication network C (later priority). As described above, after the terminal identification information is updated in the host device H, the host device H cannot be connected to the terminal device T2 via the mobile communication network C.

Accordingly, one embodiment of the present invention is performed. Processing of erasing the information on the user A remaining in the memory 107-T2 of the terminal device T2 will be described with reference to FIG. 6.

First, if the host device H stores the terminal identification information TI [T3] and the user identification information UI [A] in the memory 307 of the host device H under the control of the management part 305, then the examination part 309 of the host device H examines whether not only the terminal identification information TI [T3] but also the terminal identification information Y corresponding to the user identification information UI [A] exists in the memory 307 of the host device H (step S109). At this time, the examination part 309 examines terminal identification information of the terminal device added with use stop time information so as to avoid misrecognition that the terminal identification information (the terminal identification information TI [A1] unique to the terminal device T1) corresponding to the terminal device currently used by the user A is the terminal identification information Y. Since the examination part needs to examine the presence or absence of the terminal identification information corresponding to the user identification information UI [A] excluding the terminal identification information TI [T3] and the terminal identification information TT [A1] corresponding to the terminal device T1 which is currently used by the user A, use of the use stop time information is not essential.

If the terminal identification information Y exists, then the management part 305 of the host device H carries out control for broadcasting, to all the terminal devices included in the communication system 100, predetermined instruction information (request information for instructing information erasure processing to be described below) together with the terminal identification information Y (step S110). The broadcast method may be sequential transmission without being limited to simultaneous transmission. When some terminal devices T do not complete the reception of the instruction information due to power OFF or the like, it is preferable that the host device H repeatedly transmits the instruction information together with the terminal identification information Y to these terminal devices T in a regular or irregular manner.

Each of the terminal devices included in the communication system 100 executes information erasure processing in step S111. An information erasure part 109 of the terminal device erases information on a user other than the user stored currently in its own memory if the terminal identification information Y received together with the instruction information from the host device H matches its own terminal identification information (step S111). In this example, in the terminal devices T1 and T3 other than the terminal device T2, since the terminal identification information Y does not match its own terminal identification information, the instruction information is ignored. However, in the terminal device T2, since the terminal identification information Y matches its own terminal identification information, an information erasure part 109-T2 of the terminal device T2 erases the information on the user stored in the memory 107-T2. However, the user corresponding to the information erased by the information erasure part 109-T2 of the terminal device T2 is a person other than the user who is currently using the terminal device T2.

<Hardware Configuration>

The block diagrams used in the above description of the present embodiments indicate function-based blocks. These functional blocks (component parts) are implemented via any combination of hardware and/or software. Furthermore, the implementation of each functional block is not limited to a particular means. In other words, each functional block may be implemented by a single device that is physically and/or logically coupled, or implemented by two or more devices that are physically and/or logically separated and directly and/or indirectly (for example, wiredly and/or wirelessly) connected.

Figure 7:
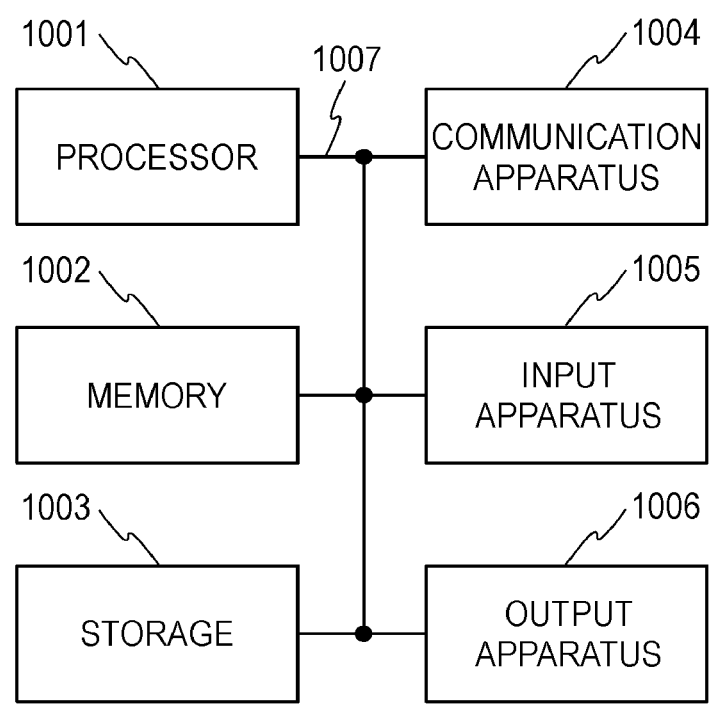
FIG. 7 shows a configuration example of hardware.

For example, the host device and the terminal device according to the embodiment of the present invention may function as a computer that performs processing of the communication method of the present invention. FIG. 7 is a diagram illustrating an example of the host device and the terminal device according to the embodiment of the present invention. Each of the host device and the terminal device may be configured physically by a computer device including a processor 1001, a memory 1002, a storage 1003, a communication apparatus 1004, an input apparatus 1005, an output apparatus 1006, a bus 1007 and so on. Note that in the following description, the term "apparatus" may be replaced with a circuit, a device, a unit or the like. In the hardware configuration of the host device and the terminal device, the number of components shown in FIG. 7 is not limited to one. In other words, for example, the number of memories may be two or more, or the number of output apparatuses may be zero.

Each function in the host device and the terminal device is realized by reading given software (program) to hardware of the processor 1001, the memory 1002 or the like, operating by the processor 1001, and controlling communication by the communication apparatus 1004 and data reading and/or writing in the memory 1002 and storage 1003.

For example, the processor 1001 controls the computer as a whole by operating an operating system. The processor 1001 may be configured by a central processing unit (CPU) including a register, an operating apparatus, a control apparatus, interface with a peripheral device and the like. For example, the above-described management part may be implemented by the processor 1001.

Further, the processor 1001 reads programs (program codes), software module, and data from the storage 1003 and/or communication apparatus 1004 to the memory 1002, and executes various types of processing in this manner. The programs include programs to make the computer operate at least a part of the operations described in the embodiments.

For example, the examination part may be realized by a control program stored in the memory 1002 and operated by the processor 1001, and other functional blocks may be also implemented in the same manner. The above-described various types of processing have been described as being executed by one processor 1001, but may be executed simultaneously or sequentially by two or more processors 1001. The processor 1001 may be mounted with one or more chips. Note that the program may be transmitted from a network via an electric telecommunication line.

The memory 1002 is a computer readable recoding medium, and may be configured by, for example, at least one of ROM (Read Only Memory), EPROM (Erasable Programmable ROM), EEPROM (Electrically Erasable Programmable ROM), RANI (Random Access Memory) and so on. The memory 1002 may be called a resister, cache, main memory (main storage device) or the like. The memory 1002 may retain executable programs (program code), software module and so on to implement the radio communication method according to the embodiment of the present invention.

The storage 1003 is a computer-readable storage medium and may be configured by at least one of an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, card, stick, key drive), a floppy (registered trademark) disk, and a magnetic strip. The storage 1003 may be called an auxiliary storage device.

The communication apparatus 1004 is hardware (transmission/reception device) for performing communication between computers via wired and/or wireless network, and may be called a network device, a network controller, a network card, a communication module, or the like.

The input apparatus 1005 is an input device (for example, a keyboard, a mouse, a microphone, a switch, a button, a sensor, etc.) that accepts an input from the outside. The output apparatus 1006 is an output apparatus (for example, a display, a speaker, an LED lamp, etc.) that performs output to the outside. The input apparatus 1005 and output apparatus 1006 may have an integrated configuration (for example, a touch panel).

Further, each apparatus such as the processor 1001 or the memory 1002 is connected by a bus 1007 for information communication. The bus 1007 may be configured by a single bus or may be configured by different buses between apparatuses.

In addition, each of the host device and the terminal device may include hardware such as a microprocessor, DSP (Digital Signal Processor), ASIC (Application Specific Integrated Circuit), PLD (Programmable Logic Device), and FPGA (Field Programmable Gate Array), or the hardware may be used to realize a part or all of the functional blocks. For example, the processor 1001 may be implemented by at least one of these types of hardware.

The "means" described in the configuration of each apparatus may be replaced with "unit", "circuit", or "device".

The above-described aspects/embodiments of the present invention may be applied to a system that utilizes LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other suitable systems and/or to an enhanced next-generation system that is based on any of these systems.

The order of processing procedures, sequences, and flowcharts in the description and claims may be changed as long as no contradictions occur.

In the description and claims, the input and out information may be stored in a specific location (for example, a memory), or managed by a management table. The input and out information may be overwritten, updated or additionally written. The out information may be deleted. The input information may be transmitted to other devices as necessary.

In the description and claims, the determination may be performed by a value represented by 1 bit (0 or 1), may be performed by a boolean value (true or false), or may be performed by numerical comparison (for example, comparison with a predetermined value).

In the embodiment described above, notification of predetermined information (for example, notification of "is X") does not need to be explicit, but may be implicitly (for example, without notification of the predetermined information) performed.

In the description and claims, software should be most widely interpreted to mean an instruction, an instruction set, a code, a code segment, a program code, a program, a subprogram, a software module, an application, a software application, a software package, a routine, a subroutine, an object, an executable file, an execution thread, a procedure, or a function regardless of the software being referred to as software, a firmware, a middleware, a microcode, a hardware descriptive language, or other names. Further, the software, the instruction, or the like may be transmitted and received via a transmission medium. For example, when the software is transmitted from a website, a server, or other remote sources using wired techniques such as a coaxial cable, an optical fiber cable, a twisted pair and a digital subscriber line (DSL) and/or wireless techniques such as infrared, radio frequency and microwave, these wired techniques and/or wireless techniques are included within definition of the transmission medium.

In the description and claims, information, signals, or the like may be represented with use of any of various different techniques. In the description and claims, for example, data, an instruction, a command, information, a signal, a bit, a symbol, a chip, and so on may be represented with a voltage, a current, an electromagnetic wave, a magnetic field, a magnetic particle, an optical field, a photon or any combination thereof. Note that "terms described in the description" and/or "terms required to understand the description" may be replaced with terms having the same or similar meanings.

In the description and claims, the terms "system" and "network" may be interchangeably used.

In the description and claims, "information" and "parameters" may be expressed as absolute values, or as a relative value from a predetermined value, or expressed as other corresponding information. For example, a radio resource may be indicated as an index. Names as used for the "information" and "parameters" are not restrictive from any standpoint. Furthermore, mathematical formulas using the "information" and "parameters" are not limited to the expression form explicitly disclosed in the description.

In the description and claims, the term "connected" or all variations thereof mean direct or indirect connection between two or more elements and can include existence of one or more intermediate elements between two mutually "connected" elements. The connection between elements may be physical, logical or in combinations thereof. If the term is used in the description and claims, it can be considered that two elements are mutually "connected" with use of one or more electric wires, cables and/or print electric connections and as several non-limiting and non-comprehensive examples, with use of electromagnetic energy such as electromagnetic energy having a wavelength of a radio frequency domain, a microwave domain and an optical (that is, both visible and invisible) domain. This is also applied to the term "coupled" and all variations thereof.

In the description and claims, unless otherwise specified, ordinal numerals (for example, formed by a combination of the prefix with a number or arithmetic number) are not intended to limit elements that are modified with the ordinal numerals or combined with auxiliary numeral in terms of the order of the elements or the amount of elements, regardless of the definition of the auxiliary numeral. The use of the auxiliary numeral is merely used as a convenient expression method to distinguish two or more elements from each other unless otherwise specified. Therefore, for example, the phrase "first X" and the phrase "second X" are expressions for distinguishing two X, and do not mean that the total number of X is 2, or that the first X should precede the second X.

In the description and claims, the term "including" and inflection thereof are used as non-exclusive expressions. For example, the sentence "X includes A and B" does not deny that X includes a component (for example, C) other than A and B. In the description and claims, when a sentence includes the term "including" or a phrase whose inflection is combined with a negative word, the sentence only refers to the term "including" or the object of the inflection. Therefore, for example, the sentence "X does not include A and B" recognizes the possibility that X includes components other than A and B. Further, the term "or" as used in the description or claims is intended not to be an exclusive OR.

As long as the terms "including", "comprising" and variations thereof are used in the description or claims, these terms are intended to be inclusive similar to the term "comprising". Furthermore, the term "or" as used in the description or claims is intended not to be an exclusive OR.

In the entire disclosure, for example, when articles such as "a", "an", and "the" is added in translation into English, such articles refers to including the plural unless otherwise recognized from the context.

Although the embodiment of the present invention has been described above, the present invention is not limited to the embodiment. Various changes and modifications are allowed without departing from the scope of the present invention. The selected and described embodiment is intended to explain the principles and practical applications of the present invention. The present invention is used as various embodiments with various changes or modifications, and various changes or modifications are determined according to use purpose to be expected. All such changes and modification are intended to be included within the scope of the present invention as defined by the appended claims, and are intended that the same protection is given when interpretation is made according to breadth given with fairness, lawfulness and justice.

What is claimed is:

1. A communication system for erasing data on a user that remains in an after-use terminal device due to change of terminal devices, the communication system comprising:
a host device; and
two or more terminal devices,
the host device including:
a host memory to store terminal identification data respectively unique to the two or more terminal devices and identification data respectively unique to two or more users; and
a processor configured to:
a) examine, responsive to newly storing in the host memory user identification data UI of a certain user among the two or more users and terminal identification data TI of one terminal device that is used by the certain user and is among the two or more terminal devices presence or absence of at least another terminal identification data TI-p that corresponds to the user identification data UI, excluding the terminal identification data TI and one or more other terminal data respectively information corresponding to one or more, being currently used by the certain user, among the two or more terminal devices; and
b) perform, responsive to presence of the at least another terminal identification data TI-p, control to broadcast predetermined instruction data together with the at least another terminal identification data TI-p to all the two or more terminal devices,
each of the two or more terminal devices including:
a terminal memory to store data on a user and own terminal identification data; and
a processor configured to erase, responsive to match of the own terminal identification data and the at least another terminal identification data TI-p received together with the instruction data from the host device the data on the user stored in the own terminal memory.

2. The communication system according to claim 1, wherein
the host device is not accessible to the terminal device having the at least another terminal identification data TI-p among the two or more terminal devices using the user identification data UI.

3. A method for erasing data on a user that remains in an after-use terminal device due to change of terminal devices in a communication system including a host device and two or more terminal devices,
the host device including:
a host memory to store terminal identification data respectively unique to the two or more terminal devices and identification data respectively unique to two or more users; and
a processor configured to:
a) examine presence or absence of data in the host memory; and
b) perform control to broadcast data to all the two or more terminal devices,
each of the two or more terminal devices including:
a terminal memory to store data on a user and own terminal identification data; and
a processor configured to erase data stored in the own terminal memory,
the method comprising:
examining, responsive to newly storing in the host memory user identification data UI of a certain user among the two or more users and terminal identification data TI of one terminal device that is used by the certain user and is among the two or more terminal devices, presence or absence of at least another terminal identification data TI-p that corresponds to the user identification data UI, excluding the terminal identification data TI and one or more other terminal identification data respectively corresponding to one or more, being currently used by the certain user, among the two or more terminal devices;

performing, responsive to presence of the at least another terminal identification data TI-p control to broadcast predetermined instruction data together with the terminal identification data TI-p to all the two or more terminal devices; and erasing, responsive to match of the own terminal identification data and the at least another terminal identification data TI-p received together with the instruction data from the host device, the data on the user stored in the own terminal memory.

\* \* \* \* \*